(12) United States Patent
Ott (10) Patent No.: US 6,862,137 B2
(45) Date of Patent: Mar. 1, 2005

(54) METHOD FOR ADJUSTING A LAMP RELATIVE TO AN ILLUMINATING BEAM PATH OF A MICROSCOPE AND A MICROSCOPE SUITABLE FOR CARRYING OUT THE METHOD

(75) Inventor: Peter Ott, Lauffen am Neckar (DE)

(73) Assignee: Carl Zeiss Semiconductor Manufacturing Technologies AG, Oberkochen (DE)

( * ) Notice: Subject to any disclaimer, the term of this patent is extended or adjusted under 35 U.S.C. 154(b) by 0 days.

(21) Appl. No.: 10/084,977

(22) Filed: Mar. 1, 2002

(65) Prior Publication Data
US 2002/0196536 A1 Dec. 26, 2002

(30) Foreign Application Priority Data
Mar. 3, 2001 (DE) ......................................... 101 10 389

(51) Int. Cl.⁷ ............................................. G02B 21/06
(52) U.S. Cl. ........................ 359/388; 359/385; 250/205; 362/285
(58) Field of Search ................................ 359/385, 388, 359/389, 368; 250/201.1, 201.3, 205; 362/285, 176

(56) References Cited

U.S. PATENT DOCUMENTS 3,833,282 A 9/1974 Kappl et al.
5,861,944 A * 1/1999 Nishi ........................... 355/68
6,179,448 B1 1/2001 Johnson et al.
6,179,488 B1 * 1/2001 Wilson ........................ 362/285

FOREIGN PATENT DOCUMENTS

DE 39 42 514 9/1990

* cited by examiner

Primary Examiner—Mark A. Robinson
Assistant Examiner—Lee Fineman
(74) Attorney, Agent, or Firm—Walter Ottesen (57) ABSTRACT

The invention relates to a method for automatic lamp adjustment in a microscope without beam homogenizers in the illuminating beam path and a microscope equipped for the application of the method. According to the invention, the light power in the illuminating beam path is integrally measured with a detector behind the pupil plane of the microscope objective or behind the pupil plane of the illuminating beam path and the lamp is so adjusted relative to the illuminating beam path that the light power, which is detected by the detector, is a maximum. In a microscope, which is suitable for an automated lamp adjustment, for example, after an exchange of the lamp according to the method of the invention, motorized drives are provided for adjusting the lamp. These drives are driven sequentially by an evaluation and control computer until a maximum light power is detected with a detector.

9 Claims, 4 Drawing Sheets

METHOD FOR ADJUSTING A LAMP RELATIVE TO AN ILLUMINATING BEAM PATH OF A MICROSCOPE AND A MICROSCOPE SUITABLE FOR CARRYING OUT THE METHOD

FIELD OF THE INVENTION

The invention relates to a method for adjusting a lamp relative to an illuminating beam path of a microscope without a beam homogenizer and a microscope suitable for carrying out the method.

BACKGROUND OF THE INVENTION

The adjustment of lamps for microscope illumination takes place usually in accordance with classical adjustment criteria which ensure a homogeneous illumination of the object field. This applies to the first adjustment of a microscope as well as to an exchange of a lamp. A first adjustment criterion is a sharp imaging of the light source, that is, of the light arc or of the lamp filament into the pupil of the objective. This adjustment criterion can be checked with the aid of a so-called Bertrand lens which images the objective pupil in the viewing field of the microscope. In lieu of a visual control of the sharp imaging, a CCD camera can be mounted in the image plane of the Bertrand lens and the image of the CCD camera is evaluated as to a sharpness of imaging. As a second criterion, the illumination in the object field itself can be checked as to homogeneity and, if necessary, the lamp is readjusted to maximum homogeneity. The object of lamp adjustment is to always ensure a substantially homogeneous illumination in the object field.

Because of the complexity of these classical methods for lamp adjustment, these methods are suited only to a limited extent to an automatization (in the first assembly and also after an exchange of lamps) in such a manner that the microscope ensures a homogeneous illumination of the object field without manual intervention. On the other hand, experience has shown that especially routine users of microscopes are often unable to make a lamp adjustment in accordance with classical adjustment criteria.

Beam homogenizers are used in illuminating devices for microlithographic apparatus and these illuminating devices ensure a homogeneous illumination of the mask to be imaged. Additionally, the position of the light source relative to the illuminating beam path is adjusted to maximum light power of the beam homogenizer so that the light power emitted by the light source is optimally utilized.

It would be conceivable to utilize beam homogenizers also for microscope illumination, for example, in the form of so-called fly-eye lenses or glass rods for mixing light. A homogeneous illumination of the object field would thereby be guaranteed independently of the positioning of the lamp relative to the illuminating beam path so that one could do completely without a lamp adjustment. The use of such beam homogenizers would, however, lead to a complexity in microscopes which could not be realized.

SUMMARY OF THE INVENTION

In view of the above, it is an object of the invention to provide a simple method for lamp adjustment in microscopes which ensures a homogeneous illumination of the object field to be illuminated and is well suited to automatization. A further object of the invention is to provide a microscope which, when utilizing the method of the invention, is suitable to bring about an adjustment of the lamp automatically which ensures a homogeneous illumination of the object field.

The method of the invention is for adjusting a lamp unit relative to an illuminating beam path of a microscope devoid of a beam homogenizer in the illuminating beam path. The microscope includes: a microscope objective defining a pupil plane; an adjustable lamp unit for supplying the light transmitted along the illuminating beam path and a detector for detecting the light power of the transmitted light. The method includes the steps of: measuring the integral light power downstream of the pupil plane of the objective with the detector; and, adjusting the light unit relative to the illuminating beam path so that the light power detected by the detector is a maximum.

The invention is based on the recognition that a homogeneous illumination of the illuminated field is guaranteed also for illuminating beam paths without beam homogenizers when the areally integral light power behind the pupil plane of the microscope objective or behind the pupil plane of the illuminating bear, path is a maximum with the operating conditions of the lamp being otherwise constant. Correspondingly, in the method according to the invention, the areally integral light power behind the pupil plane of the microscope objective or behind the pupil plane of the illuminating beam path is measured by a detector and the lamp body is so adjusted relative to the illuminating beam path that the integral light power, which is detected with the detector, is a maximum. What is here important is that the integral detection of the light power takes place only after passing through the diaphragm delimiting the light flow.

Based on the recognition of the invention, a simple adjustment criterion is provided which is exceptionally well suited for the automated adjustment of the lamp after a lamp exchange or for the automated adjustment of the lamp in a first adjustment. The adjustment of the lamp can be motor controlled via software. The realization of the invention is, however, also usable in the manual adjustment of the lamp because the adjustment criterion of a maximum integral light power can be checked much more simply by the inexperienced operator than the conventional adjusting criterion of a sharp imaging of a lamp arc in the objective pupil by means of a Bertrand lens.

A microscope, which is suitable for automatic lamp adjustment, includes motorized drives for adjusting the lamp relative to the illuminating beam path as well as an evaluation and control computer. The motorized drives operate to displace optical components in the illuminating beam path and this beam path is without beam homogenizers. The evaluation and control computer sequentially controls the motorized drives for lamp adjustment in such a manner until a maximum of the integral light power is measured by a detector mounted behind the pupil plane of the illuminating beam path or of the microscope objective.

The detector for detecting the light power can be integrated into the illuminating beam path. In this case, it is advantageous when a reflecting region is provided on the specimen table of the microscope and when the detector detects the light reflected at the reflecting region. Alternatively, a portion of the illuminating beam path can be reflected out onto a detector.

Furthermore, it is possible to provide the detector for detecting the light power more or less open on the specimen table. This embodiment is especially suitable for retrofitting already existing microscopes as well as for use of the invention within already existing series of microscopes.

The following are all suitable as a detector: an individual diode, a four-quadrant diode or even a CCD camera. In the case of a quadrant diode or a CCD sensor, the light power, which is detected with the individual sensor parts or sensor regions, is integrated over an area at the detector output. The use of a CCD sensor or a CCD camera is especially considered when, for example, a CCD camera is anyway provided for image documentation as, for example, in reflected light microscopes.

For applying the invention, the lamp can be adjusted either in three mutually orthogonal spatial directions relative to the illuminating beam path or, it is also possible, to adjust the lamp only in two mutually perpendicular spatial directions and a collector optic, which is arranged in the beam path, is displaceable along the optical axis of the remaining illuminating beam path.

A gradient method can preferably be used for locating the maximum light power. In such a gradient method, and starting from an initial position, the maximum gradient of the light power is determined in dependence upon a position change of the lamp relative to the illuminating beam path and/or the lamp and the collector optic relative to the illuminating bean path and, thereafter, the lamp and/or the collector optic is shifted in the direction of the maximum gradient of the light power in the illuminating beam path.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
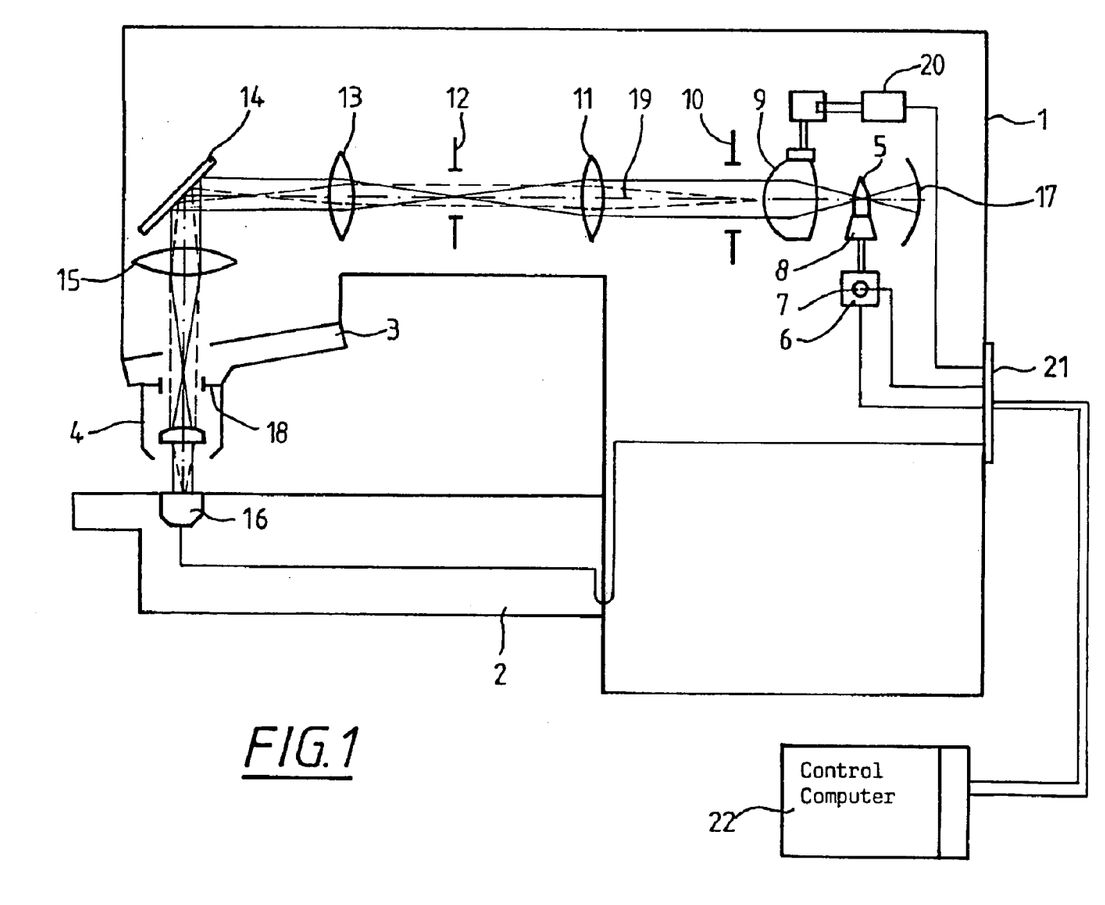
FIG. 1 is a reflected light microscope, in section, having a detector integrated in the specimen table.

In FIG. 1, the upper part of the microscope stand with the illuminating beam path accommodated therein is identified by reference numeral 1. A specimen table 2 adjustable in elevation for focusing is accommodated on the microscope in a manner known per se. Furthermore, the microscope includes a lens turret 3 containing objectives 4 of which only one is shown in FIG. 1.

The reflecting illuminating beam path in the microscope of FIG. 1 includes, in principle, the components which are usual for the adjustment of the Köhler illuminating conditions. A halogen lamp or a gas discharge lamp 5 can be provided as a light source. The light, which is emitted by the lamp 5, is collimated by a collector lens 9 and, if required, is collimated in combination with a collector mirror 17 which collects the backward radiated light and reflects it back into the lamp 5. A field diaphragm 10 is provided in the region of the collimated beam path and is adjustable with respect to its aperture diameter. The field diaphragm 10 is arranged conjugated to the focal plane of the microscope objective 4. A lens 11 is mounted downstream of the field diaphragm 10 and images the field diaphragm 10 to infinity. A second diaphragm 12 is provided in the focal plane of lens 11 for adjusting the illumination aperture. The second diaphragm 12 is adjusted with respect to its aperture diameter and is imaged to infinity by a downstream lens 13 and, after being reflected into the viewing beam path, the aperture diaphragm 12 is imaged into the exit pupil 18 of the microscope objective 4 by the tube lens 15 via a beam splitter 14. The tube lens 15 is in the common part of the illuminating and viewing beam path.

A large area diode 16 is integrated as a detector in the specimen table 2 of the microscope. With the diode 16, the total light intensity focused by the microscope objective 4 is detected. This diode 16 can be configured as a simple large-area diode. However, it is especially advantageous to configure the diode 16 as a four-quadrant diode. In this last case, this diode 16 can thereby simultaneously function to also calibrate the specimen table in that the center point of the four-quadrant diode defines the origin of the axes as a reference point, for example, as zero point for the X/Y adjustment of the specimen table.

The diameter of the light-sensitive area of the diode 16 is at least as large as the diameter of the field illuminated in the focal plane of the objective 4. In a quadrant diode, the diameters of the four quadrants together are taken as the diameter.

For realizing an automated lamp adjustment, the receptacle or holder 8 of the lamp 5 is adjustable by two motorized drives (6, 7) in the two directions perpendicular to the optical axis 19 of the illuminating beam path. The collector lens 9 is displaceable in the direction of the optical axis 19 by a further motorized drive 20. Alternatively to a displacement of the lamp 5 as well as the collector lens 9, the lamp 5 can also be displaceable via three appropriate drives in the three mutually perpendicular spatial directions. However, for this purpose, a correspondingly more complex mechanism is required because of the degrees of freedom which would be required for an adjustment in the three mutually perpendicular directions independently of each other.

Position sensors provide input signals representing the end positions of the drives (6, 7, 20) so that information is provided to a computer 22 as to the actual positions reached by the respective drives (6, 7, 20). Alternatively, the drives (6, 7, 20) can be step motors so that the distance to be moved is known from the number of steps to be executed.

The adjusting drives (6, 7) of the lamp 5 and the adjusting drive 20 of the collector lens 9 are drivable by the control computer 22 across an interface 21. The output signals of the diode 16 are supplied to the control computer 22 over the same interface 21.

The method steps, which are run through for an automatic lamp adjustment, are explained in greater detail in the following with respect to FIG. 2. The adjusting process begins with an initial step 30 which is, for example, triggered in that the user confirms a completed exchange of lamps via a key pad. In a next initialization step 31, the specimen table 2 is moved in the direction of the optical axis of the microscope objective 4 as well as in the two directions perpendicular thereto so that the diode 16 is positioned beneath the microscope objective 4 and, as a consequence, detects the total light power, which is collected by the microscope objective 4. This initialization can, of course, take place also automated if the microscope has a motorized focusing drive and a motorized X/Y table. In this case, the control and evaluation computer 22 correspondingly controls the motorized drives for the focusing and the lateral position of the specimen table. If no motorized drives for the focusing and the X/Y table are provided, then the user receives the command via the key pad to so adjust the specimen table that the diode 16 is positioned directly beneath the objective 4.

In the next two steps (32, 33), an assignment of a variable takes place wherein the value of a variable "new position" is assigned to a variable "old position" and the value of a variable "position a" is assigned to the variable "new position". For the first-time runthrough of the process, fixed pregiven values are utilized for these variables in the initialization step 31. In a next step 34, the drives (6, 7) of the lamp and the drive 20 of the collector lens are so driven that the drives assume the values of the variable "new position". Thereafter, a measurement of the light power takes place with the diode 16 and a readout of the measured light power takes place as well as, subsequently, in a step 35, a further variable assignment takes place in that the value of the measured light power is assigned to a variable "light power of new position". In a next step 36, a decision inquiry takes place as to whether the value of the variable "light power of old position" (which likewise was assigned a value in the initialization step) is less than the value of the variable "light power of new position". In the event this question is answered in the negative, then, in a step 37, a variable "actual step width" is assigned the value of a variable "countdown" and in a next step 38, the variable "light power of new position" is assigned the value of the variable "light power of old position". In a next step 39, the value of a variable "position a" is computed as the sum of the variable "old position" and the product of the value of the variable "actual step width" and the variable "derivative of light power". In a next decision step 40, a check is made as to whether the value of the variable "factual step width" is greater than a pregiven limit value. If this inquiry is answered in the affirmative, then the routine jumps with the new values back to the above step 32 so that the subsequent steps are run through anew. If, in contrast, the inquiry in step 40 is answered with "false", then the end of the routine is reached.

If, in the above-described step 36, the inquiry as to whether the value of the variable "light power of old position" is less than or equal to the value of the variable "light power of new position" is answered in the affirmative, then, in step 41, the variable "actual step width" is assigned the value of a variable "count up" and, thereafter, in step 42, the gradient of the light power is measured. The details with respect to the measurement of the gradient of the light power are described below with respect to the sequence diagram in FIG. 3. After the measurement of the gradient of the light power, the value of the measured gradient is assigned to the variable "derivative of light power" and, thereafter, in step 43, the value of the sum of the variables "new position" and the product of the variables "actual step width" and "derivative of light power" is assigned to the variable "position a". Thereafter, the routine arrives also via this branch at the inquiry 40 as to whether the value of the variable "actual step width" is greater than a limit value, and, in the case that this inquiry is answered in the negative, the routine arrives at the end of the routine and, in the case that this question is answered in the affirmative, the routine also in this case returns to step 32 downstream of the initialization step 31.

A method for determining the gradient of the light power is described in greater detail in the following with respect to FIG. 3. In two first assignment steps, the value of the variable "light power" is assigned to the variable "actual light power" and the value of the variable "new position" is assigned to the variable "actual position". The values of these variables are either known from the previously run steps in accordance with FIG. 2 or are determined in the initialization step 31 according to FIG. 2. In two further initialization steps (53, 54), the values of the index variables (i) and (N) are determined. Thereafter, each individual drive (6, 7) of the lamps and the drive 20 of the collector lens is sequentially displaced by a pregiven step width $d_i$ and the light power impinging in each case on the diode 16 is measured in a step 55. In a next step 56, the change of the light power is measured, that is, the difference of the variable "light power" and the variable "actual light power" is computed. These steps are carried out for all three drives separately one after the other. After the difference values of the light power for the drive is present for all three drives, the gradient of the light power (that is, a value of the variable "derivative of light power") is computed in step 37 as a vectorial quantity. The value of the vectorial quantity "derivative of light power" which was so computed is then used in steps 39 and 43 to compute the new position "position a" which is to be controlled to.

Figure 4:
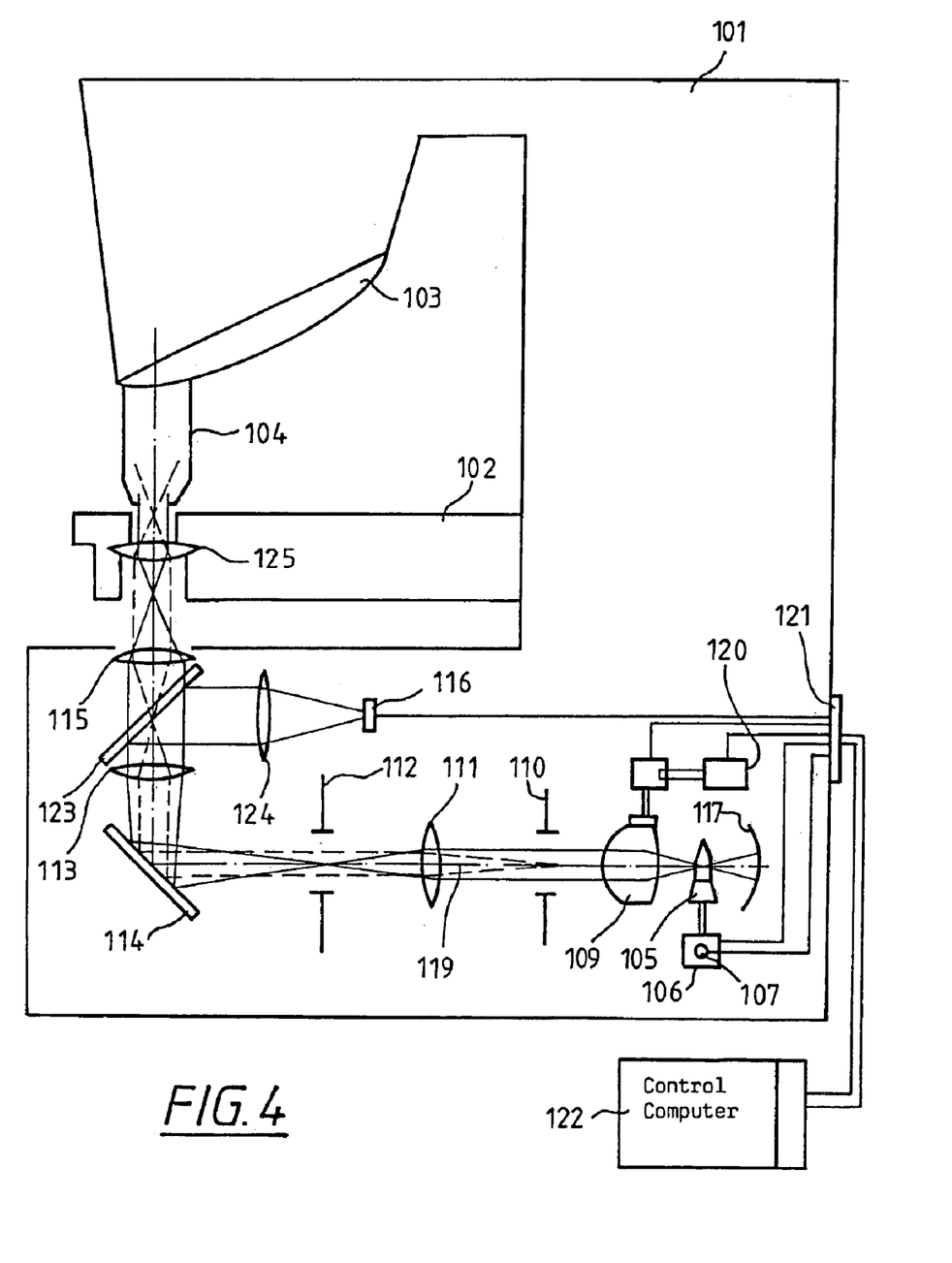

In FIG. 4, a microscope according to the invention is shown having a transmitted-light illumination. Those components in the embodiment of FIG. 4, which correspond to the components in the embodiment of FIG. 1, each have the same reference numeral increased by 100. The light, which is emitted by a lamp 105, is collimated by a collector lens 109 and a collector mirror 117. A diaphragm 110 follows the collector lens 109 and is variable with respect to its aperture diameter. With respect to the downstream optic, the diaphragm 110 is arranged so as to be conjugated to the focal plane of the objective 104 and functions to adjust the illuminated field. A lens 111, which follows the field diaphragm 110, generates an image of the light source of the lamp 105 in the plane of an aperture diaphragm 112. At the same time, the lens 111 images the field diaphragm 110 to infinity. Two further lenses (113, 115) follow behind a deflecting mirror 114. On the one hand, the two additional lenses (113, 115) together image the plane of the aperture diaphragm 112 in the rear focal plane of the transmitted-light condenser 125 and, simultaneously, image the field diaphragm 110 to infinity. The transmitted-light condenser 125 is integrated into the specimen table 102. A so-called Köhler illumination can be adjusted in this embodiment in a manner known per se by adjusting the aperture diameters of the field diaphragm 110 and the aperture diaphragm 112.

A partially transmitting mirror 123 is arranged rearward of the aperture diaphragm 112 for detecting the integral light power within the illuminating beam path. A small portion of the illuminating light is coupled out via the mirror 123 and is focused via a downstream lens 124 on a diode 116 integrated into the base of the microscope.

In this embodiment too, the lamp 105 is motorically adjustable in two mutually perpendicular directions perpendicular to the optical axis 119. For this purpose, the motorized drives (106, 107) are provided. Furthermore, also in this embodiment, the collector lens 109 is adjustable via a motor drive 120 in the direction of the optical axis 119 for adjusting the illumination. The drive of the drive motors (106, 107) for adjusting the lamp 105 and the drive of the drive 120 for the axial displacement of the collector lens 109 again takes place via a control computer 122 as well as via an interface 121, which is provided on the microscope stand. The output signal of the diode 116 is supplied to the control computer 122 also via the interface 121.

Figure 2:
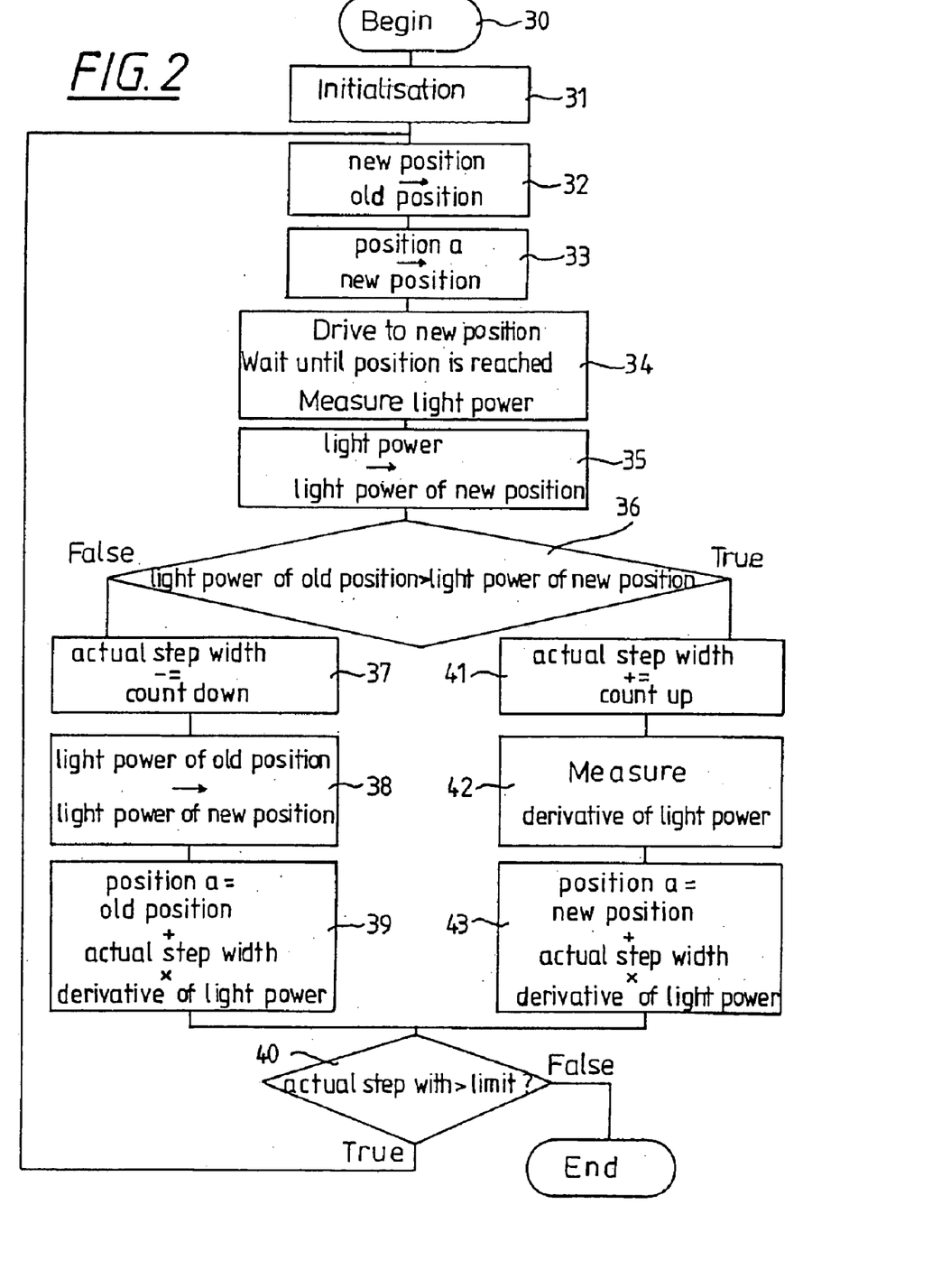
FIG. 2 is a flowchart of the process steps which are run through with the automated lamp adjustment in a microscope.
Figure 3:
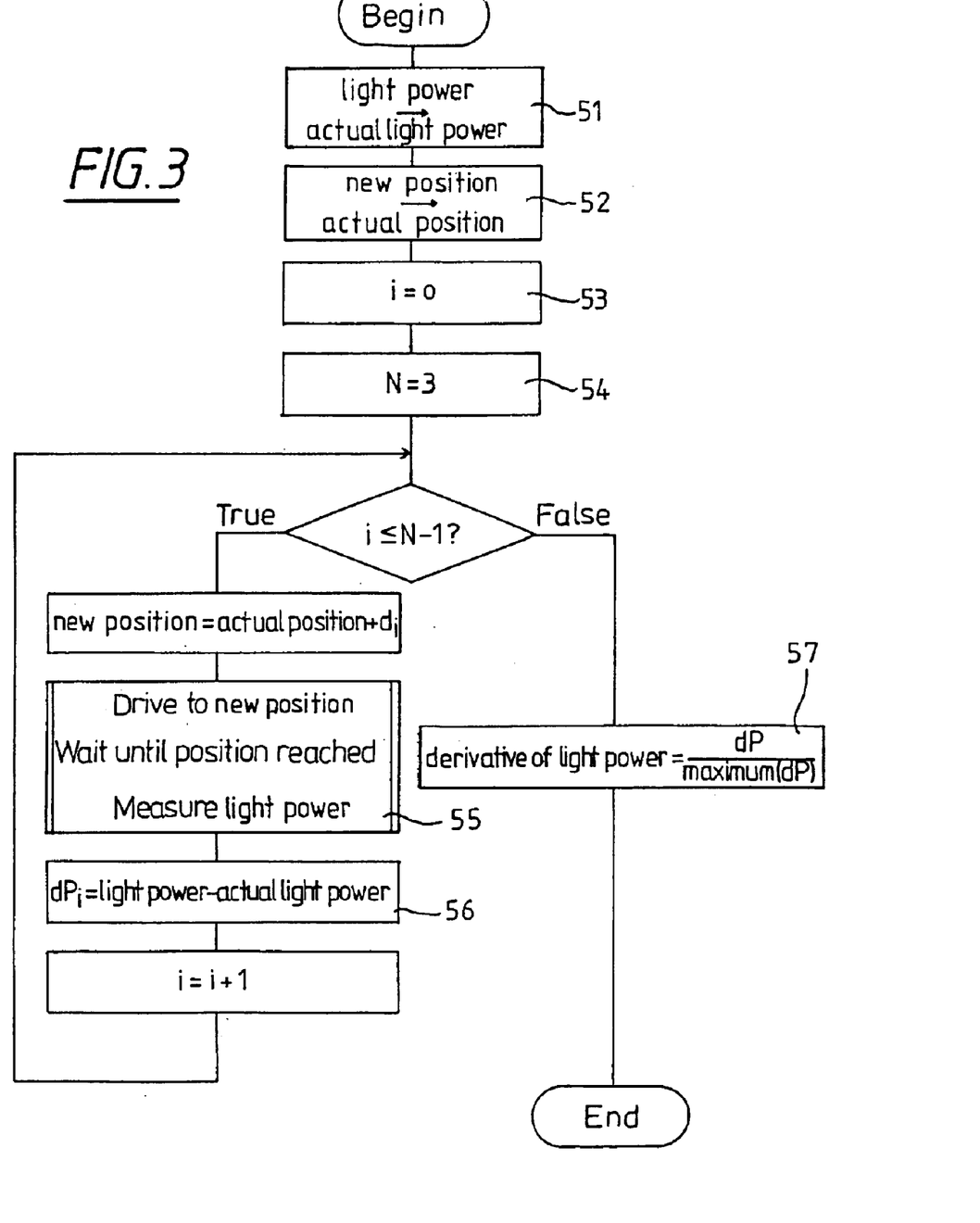
FIG. 3 is a flowchart of the process steps which are run in the gradient method for locating the maximum light power; and, FIG. 4 shows a microscope, in section, having a detector integrated into the illuminating beam path.

In the embodiment of FIG. 4 having the diode 116 integrated into the illuminating beam path, it is significant for the adjustment of the lamp 105 in accordance with the method described with respect to FIGS. 2 and 3 that the position of the aperture diaphragm 112 is conjugated to the position of the entry pupil of the condenser 125 and, with respect to its aperture diameter, corresponds to the pupil diameter of the condenser 125 while considering the magnification or demagnification effected by the two lenses (113, 115). Requirements of this kind are not present in the embodiment of FIG. 1; however, it is there necessary that the diameter of the light-sensitive region of the diode 16 is greater than or equal to the diameter of the illumination field illuminated by the objective 4.

The method according to the invention described above can, of course, be utilized not only for the adjustment of the lamp (5, 105) relative to the illuminating beam path but, for a first adjustment, can also be used to adjust the collector mirror (17, 117) relative to the collector (9, 109). For this purpose, the lamp and the concave mirror can be iteratively adjusted alternately to maximum power at the diode (16, 116). After a coarse preadjustment of the collector mirror, approximately three or four iterations are necessary in order to achieve an optimal adjustment. Thereafter, when there is an exchange of lamps, only the lamp is adjusted perpendicular to the optical axis and the collector lens (9, 109) is adjusted in the direction of the optical axis. An adjustment of the collector mirror (17, 117) is later not necessary when there is an exchange of lamps.

The method of the invention was described above with respect to the gradient method for determining the position of the lamp with maximum light power. The gradient method affords the advantage that it can, on the one hand, be implemented simply and, on the other hand, leads to an optimal adjustment with relatively few iteration steps. In lieu of a gradient method, other algorithms are, however, conceivable, for example, algorithms with which the individual drives are each driven sequentially until each individual direction of movement reaches the maximum of light power and these steps are repeated sequentially a number of times until the absolute maximum as to detected light power is achieved.

It is understood that the foregoing description is that of the preferred embodiments of the invention and that various changes and modifications may be made thereto without departing from the spirit and scope of the invention as defined in the appended claims.

What is claimed is:

1. A method for adjusting a lamp unit relative to an illuminating beam path of a microscope devoid of a beam homogenizer in said illuminating beam path, said microscope including: a microscope objective defining a pupil plane; an adjustable lamp unit for supplying the light transmitted along said illuminating beam path and a detector for detecting the light power of the transmitted light, the method comprising the steps of:

measuring the integral light power downstream of said pupil plane of said objective with said detector;

beginning from a start position and determining the maximum gradient of the light power in dependence upon a position change of said lamp unit relative to said illumination beam path; and, displacing said lamp unit in a direction of the maximum gradient of light power until the light power detected by said detector is a maximum.

2. The method of claim 1, wherein the adjustment of said lamp unit takes place using a motor controlled by software.

3. The method of claim 2, wherein said microscope includes an evaluation computer and motors for moving said lamp unit relative to said illuminating beam path, the method comprising the further step of utilizing said computer to drive said motors for moving said lamp unit until said maximum of said light power is reached.

4. A microscope comprising:

a specimen table;

a light unit for supplying a light for illumination along an illuminating beam path devoid of a beam homogenizer;

motor drives for adjusting said light unit relative to said illuminating beam path;

a microscope objective defining a pupil plane;

a detector integrated into said specimen table;

an evaluation and control computer connected to said detector and functioning to sequentially drive said motor drives until a maximum of an integral light power is measured with said detector;

said microscope defining an optical axis along said beam path;

a collector antic mounted in said illuminating beam path downstream of said lame unit;

an additional motor drive for displacing said collector optic along said optical axis;

wherein said evaluation and control computer further functions to apply a gradient method for locating said maximum of said light power by carrying out the following steps:

beginning from a start position and determining the maximum gradient of the light power in dependence upon a position change of at least one of said lamp unit and said collector optic; and, displacing at least one of said lamp unit and said collector optic in a direction of the maximum gradient of the integral light power.

5. A method for adjusting a lamp unit relative to an illumination beam path of a microscope devoid of a beam homogenizer in said illumination beam path, said microscope including: an optic defining a pupil plane in said illuminating beam path; an adjustable lamp unit for supplying the light transmitted along said illumination beam path and a detector for detecting the light power of the transmitted light, the method comprising the steps of:

measuring the integral light power downstream of said pupil plane with said detector;

beginning from a start position and determining the maximum gradient of the light power in dependence upon a position change of said lamp unit relative to said illumination beam path; and, displacing said lamp unit in a direction of the maximum gradient of light power until the light power detected by said detector is a maximum.

6. The method of claim 5, wherein the adjustment of said lamp unit takes place using a motor controlled by software.

7. The method of claim 6, wherein said microscope includes an evaluation computer and motors for moving said lamp unit relative to said illuminating beam path, the method comprising the further step of utilizing said computer to drive said motors for moving said lamp unit until said maximum of said light power is reached.

8. A microscope comprising:

a specimen table;

a light unit for supplying a light for illumination along an illumination beam path devoid of a beam homogenizer;

motor drives for adjusting said light unit relative to said illuminating beam path;

an optic defining a pupil plane in said illumination beam path;

a partially transmitting mirror mounted in said illumination beam path upstream of said specimen table;

a detector mounted in a beam path deflected by said partially transmitting mirror downstream of said pupil plane for detecting the light power in said illumination beam path;

an evaluation and control computer connected to said detector and functioning to sequentially drive said motor drives until a maximum of an integral light power is measured with said detector; and, said evaluation and control computer further functioning to apply a gradient method for locating said maximum of said light power by carrying out the following steps:

beginning from a start position and determining the maximum gradient of the light power in dependence upon a position change of at least one of said lamp unit and said collector optic; and, displacing at least one of said lamp unit and said collector optic in a direction of the maximum gradient of the integral light power.

9. The microscope of claim 8, wherein said microscope defines an optical axis along said beam path; and, said microscope further comprises: a collector optic mounted in said illuminating beam path downstream of said lamp unit; and, an additional motor drive for displacing said collector optic along said optical axis.

* * * * *

UNITED STATES PATENT AND TRADEMARK OFFICE
CERTIFICATE OF CORRECTION

PATENT NO. : 6,862,137 B2
DATED : March 1, 2005
INVENTOR(S) : Peter Ott

It is certified that error appears in the above-identified patent and that said Letters Patent is hereby corrected as shown below:

Column 2,
Line 21, delete "bear," and insert -- beam -- therefor.

Column 3,
Line 24, delete "bean" and insert -- beam -- therefor.

Column 5,
Line 31, delete "factual" and insert -- actual -- therefor.

Column 8,
Line 20, delete "antic" and insert -- optic -- therefor.
Line 21, delete "lame" and insert -- lamp -- therefor.

Signed and Sealed this

Seventeenth Day of May, 2005

JON W. DUDAS
*Director of the United States Patent and Trademark Office*